C. T. HURD.
Insect-Destroying Attachments for Cultivators.

No. 145,949.   Patented Dec 30, 1873.

Witnesses
James Thurton
John Carman

Charles T. Hurd
by E. Thurton his atty

UNITED STATES PATENT OFFICE.

CHARLES T. HURD, OF VICTORIA, TEXAS.

IMPROVEMENT IN INSECT-DESTROYING ATTACHMENTS FOR CULTIVATORS.

Specification forming part of Letters Patent No. 145,949, dated December 30, 1873; application filed October 15, 1873.

*To all whom it may concern:*

Be it known that I, CHARLES T. HURD, of Victoria, in the county of Victoria, in the State of Texas, have invented a Powder-Blowing Attachment to Cultivators (or similar machines) for Destroying Worms and Insects which Infest Plants; and do hereby declare that the following is a full, clear, and exact description thereof, reference being had to the annexed drawings making a part of this specification, in which like letters of reference refer to like parts, and in which—

Figure 1:
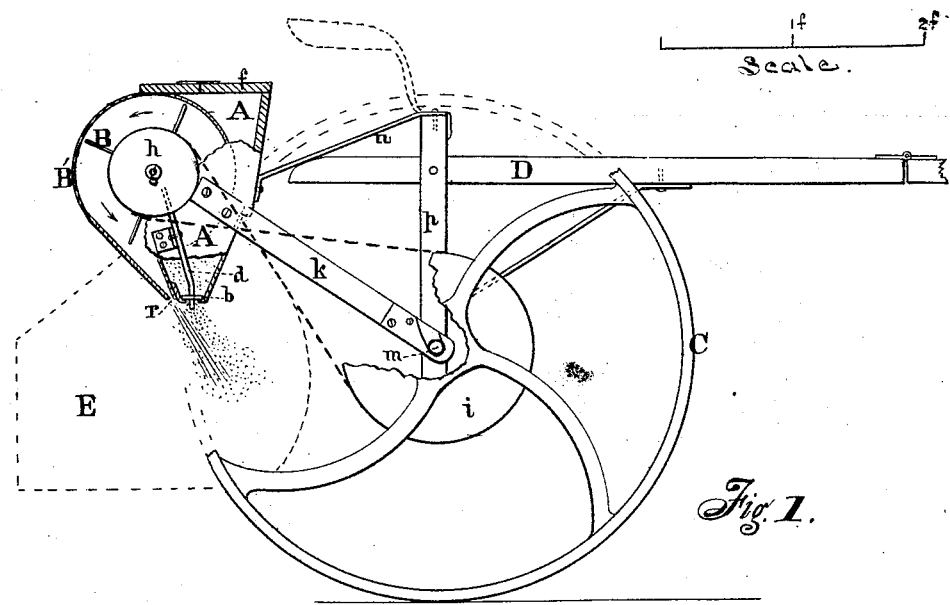
Figure 2:
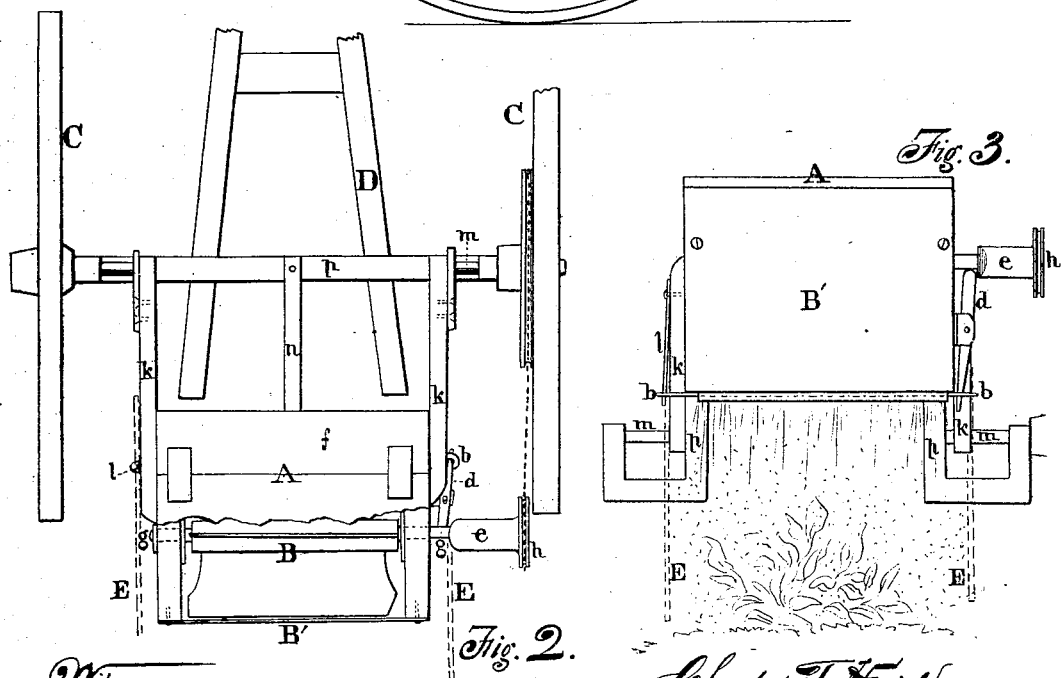
Figure 3:
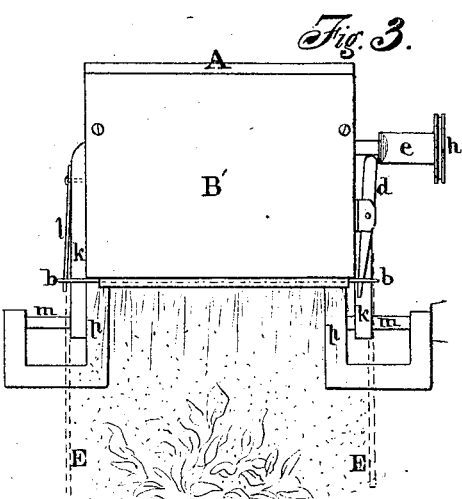

Figure 1 represents a sectional elevation of the apparatus as attached to a cultivator, showing one end of the box A partly broken away; Fig. 2, a plan, with part of the blower-box removed; Fig. 3, rear view of blower-box and powder-box as attached to the cultivator-axles.

This invention consists of a fan or blower conjoined with a box containing any of the various powdered poisons used for destroying vermin which infest growing plants, as cotton, potatoes, &c., operated by a pulley and band, running from the axle of the blower to a wheel on the supporting-axle of the cultivator, seeder, or other machine to which the apparatus may be attached, which drives a current of air charged with the powder, both upon the upper and under surfaces of the plants, so as to envelope them in a thick cloud, the extent of which may be confined on either side by vertical guards or shields, reaching to near the surface of the field.

The following is a description of one of the forms in which I construct this apparatus.

In the drawings, A represents an oblong box, tapering to the bottom, which contains the powdered poison, having a flap or door, *f*, on its top, and opening at said bottom onto a wire screen or cloth, *b*, running from end to end of the box, which screen is oscillated lengthwise, and across the row of plants by a lever, *d*, pivoted on one side of the box A, and engaged at the other end against a rotating cam, *e*, upon the axle of the blower B. A spring, *l*, keeps the lever engaged with face of the cam. The blower B is confined alongside of the box A in a cylindrical casing, B', of a common form, and is mounted on a horizontal axle, *g*, which ends in a pulley, *h*, opposite to another pulley, *i*, upon the supporting-axle *m* of the cultivator. The box A and the blower-box form one whole box, and is supported at either end by arms *k k*, which are centered upon the said supporting-axles *m m*, for the purpose of allowing the box A to be raised or lowered in the application of the powder. A ratchet or brace, *n*, for this purpose extends from the box A to a convenient part of the cultivator. The orifice *r* of the blower-box opens parallel with or close alongside of the oscillating screen *b*, so that the air-current catches and directs the powder against the plants, as it is shaken through the screen from the powder-box.

By changing the oscillating screen *b*, and inserting a perforated bottom in the box A, and charging the latter with poisonous liquids, I vaporize the water as it issues from the box, and accomplish similar ends sought to be done by the powder, as above applied.

To confine the powder to the plants and vicinity side guards or hoods E E, of sheet metal or light wood, as shown by the dotted lines, may be advantageously employed, and be attached to the supports *k k* or other convenient part or place.

A seat may also be attached to the arch *p* or beams D D of the cultivator, for the use of the driver.

The alteration of this apparatus in a slight degree, *i. e.*, converting it into a vaporizer, so as to throw a jet of poisoned vapor upon plants, might possibly enlarge the sphere of its usefulness.

What I claim as my invention is—

1. The poison-powder box A, constructed with a lower opening or exit adjoining and parallel to the like opening *r* of the blower B B', in combination with band-pulley *h* and band-wheel concentric with the supporting-wheels C C of a cultivator or seeder, substantially as described.

2. The combination of the blower B B', having a pulley, *h*, and orifice *r*, with the poison-box A, having an oscillating screen, *b*, and lever *d*, and supported on the braces or arms $k$ $k$, centered upon the supporting-axles of a cultivator or similar machine, substantially as described.

3. In combination with a cultivator, seeder, or similar machine, the poison-blower A B B' $h$, connected to the axles of the machine by means of the adjusting-levers $k$ $k$, substantially as described.

In testimony that I claim the foregoing poison-disseminator, I have hereunto set my hand this 8th day of October, 1873.

CHARLES T. HURD.

Witnesses:
HENRY W. WELLS,
JOHN CARMAN.